US006755895B2

(12) United States Patent
Lomax, Jr et al.

(10) Patent No.: US 6,755,895 B2
(45) Date of Patent: Jun. 29, 2004

(54) METHOD AND APPARATUS FOR PRESSURE SWING ADSORPTION (75) Inventors: Franklin D. Lomax, Jr, Arlington, VA (US); Michael S. Streeks, Alexandria, VA (US)

(73) Assignee: H2GEN Innovations, Inc., Alexandria, VA (US)

( * ) Notice: Subject to any disclaimer, the term of this patent is extended or adjusted under 35 U.S.C. 154(b) by 110 days.

(21) Appl. No.: 10/269,067

(22) Filed: Oct. 11, 2002

(65) Prior Publication Data

US 2003/0188635 A1 Oct. 9, 2003

Related U.S. Application Data (60) Provisional application No. 60/370,702, filed on Apr. 9, 2002.

(51) Int. Cl.$^7$ .............................................. B01D 53/47
(52) U.S. Cl. ........................ 95/97; 95/104; 95/130; 96/130; 96/144
(58) Field of Search ............................ 95/96–106, 130, 95/138, 109–117, 133, 142–144, 147; 96/151

(56) References Cited

U.S. PATENT DOCUMENTS

| 3,323,292 | A | * | 6/1967 | Brown ........................ 96/110 |
| 3,324,631 | A | * | 6/1967 | Kreuter ....................... 96/113 |
| 3,430,418 | A | * | 3/1969 | Wagner ....................... 95/100 |
| 3,564,816 | A | * | 2/1971 | Batta .......................... 95/100 |
| 3,738,087 | A | * | 6/1973 | McCombs .................... 95/98 |
| 3,986,849 | A | * | 10/1976 | Fuderer et al. ............... 95/100 |
| 4,194,890 | A | * | 3/1980 | McCombs et al. ............ 95/23 |
| 4,247,311 | A | * | 1/1981 | Seibert et al. ................ 96/111 |
| 4,272,265 | A | * | 6/1981 | Snyder ........................ 96/115 |
| 4,512,781 | A | * | 4/1985 | Caralli et al. ................. 95/98 |
| 4,559,065 | A | * | 12/1985 | Null et al. .................... 96/111 |
| 4,673,419 | A | * | 6/1987 | Kojima ........................ 96/144 |
| 4,698,075 | A | * | 10/1987 | Dechene ...................... 96/116 |
| 4,761,165 | A | * | 8/1988 | Stocker et al. ................ 95/22 |
| 4,806,134 | A | * | 2/1989 | Lhota .......................... 96/114 |
| 4,877,429 | A | * | 10/1989 | Hunter ......................... 95/95 |
| 4,925,464 | A | * | 5/1990 | Rabenau et al. .............. 96/124 |
| 5,002,591 | A | * | 3/1991 | Stanford ....................... 95/98 |
| 5,286,282 | A | * | 2/1994 | Goodell et al. ............... 96/113 |
| 5,286,283 | A | * | 2/1994 | Goodell ....................... 96/113 |
| 5,340,381 | A | * | 8/1994 | Vorih .......................... 95/21 |
| 5,522,150 | A | * | 6/1996 | Schultz ........................ 34/80 |
| 3,258,899 | A | * | 7/1996 | Coffin ......................... 96/114 |
| 5,549,736 | A | * | 8/1996 | Coffield et al. ............... 96/133 |
| 5,575,541 | A | * | 11/1996 | Elamin ........................ 303/1 |
| 5,578,115 | A | * | 11/1996 | Cole ........................... 96/121 |
| 5,632,804 | A | * | 5/1997 | Schartz ........................ 95/101 |
| 5,662,727 | A | * | 9/1997 | Castle et al. ................. 96/115 |
| 5,766,310 | A | * | 6/1998 | Cramer ........................ 95/96 |
| 5,827,354 | A | * | 10/1998 | Krabiell et al. ............... 95/96 |
| 5,901,459 | A | * | 5/1999 | Trapp et al. .................. 34/81 |
| 5,902,551 | A | * | 5/1999 | Cowan et al. ................ 422/103 |
| 5,928,415 | A | * | 7/1999 | Girard et al. ................. 96/4 |
| 5,961,698 | A | * | 10/1999 | Dossaji et al. ................ 96/130 |
| 5,997,617 | A | * | 12/1999 | Czabala et al. ............... 96/130 |
| 6,036,754 | A | * | 3/2000 | Rowe .......................... 96/130 |
| 6,063,161 | A | * | 5/2000 | Keefer et al. ................. 95/100 |
| 6,146,450 | A | * | 11/2000 | Duhayer et al. .............. 96/130 |
| 6,152,163 | A | * | 11/2000 | Tsargorodski et al. ........ 137/240 |
| 6,200,365 | B1 | * | 3/2001 | Eimer et al. .................. 95/19 |
| 6,290,759 | B1 | * | 9/2001 | Fenner et al. ................. 96/130 |

FOREIGN PATENT DOCUMENTS

| GB | 0425621 A | * | 3/1935 |
| GB | 2232364 A | * | 12/1990 |

* cited by examiner

Primary Examiner—Robert H. Spitzer
(74) Attorney, Agent, or Firm—Oblon, Spivak, McClelland, Maier & Neustadt, P.C.

(57) ABSTRACT

A pressure swing adsorption system including a pressure vessel having an opening and a valve manifold including a body having a first cavity fluidly connected to the opening. The body further includes a passage and a channel, such that the passage connects the channel to the cavity. The valve manifold further includes a valve provided within the passage. The valve is configured to selectively permit and restrict flow between the channel and the cavity via the passage.

51 Claims, 9 Drawing Sheets

METHOD AND APPARATUS FOR PRESSURE SWING ADSORPTION

CROSS-REFERENCE TO RELATED APPLICATIONS

This application is related to Provisional Application No. 60/370,702, entitled IMPROVED METHOD AND APPARATUS FOR PRESSURE SWING ADSORPTION, which was filed on Apr. 9, 2002. The contents of that application are incorporated herein by reference.

BACKGROUND OF THE INVENTION

1. Field of the Invention

The present invention relates to valve assemblies for pressure swing adsorption systems.

2. Discussion of the Background

Pressure Swing Adsorption (PSA) is a technique used to fractionate mixtures of gases to provide at least one purified product gas and a raffinate byproduct mixture. PSA has been successfully used to separate hydrogen from other gases, oxygen and nitrogen from air, helium from natural gas, among others.

Early PSA systems generally used four adsorbent vessels operated in parallel. An example of such a PSA system is described in U.S. Pat. No. 3,430,418 to Wagner. Later improvements to Wagner's process added an additional pressure equalization step while retaining four adsorbent beds (see U.S. Pat. No. 3,564,816 to Batta), and subsequently added even more pressure equalization steps to seven or more beds (see U.S. Pat. No. 3,986,849 to Fuderer et al.). These increases in the number of pressure equalizations and the number of adsorbent vessels were implemented to increase the product recovery and the adsorbent productivity. Unfortunately, the increases in performance were also accompanied by a coincident increase in the number of valves required to operate the systems. For example, the Wagner system utilized at least thirty-one valves, the Batta system utilized at least thirty-three valves, and the Fuderer et al. system utilized at least forty-four valves.

The increase in the number of adsorbent vessels and valves in PSA systems undesirably increases manufacturing and operational costs. Many innovative cycles have been proposed that economize the number of beds and/or valves employed in PSA systems. An excellent example of such a system is described in U.S. Pat. No. 3,738,087 to McCombs, as well as a later process described in U.S. Pat. No. 4,194,890 to McCombs. These patents describe PSA systems with as few as two adsorbent vessels; however, continual delivery of product is usually impossible or can be achieved only at a reduced product pressure. Furthermore, these sorts of cycles are generally understood to offer lower product gas recovery and adsorbent utilization at a given set of feed conditions. Efforts to produce more complex cycles with fewer valves, or at least simpler plumbing arrangements than that of Wagner, Batta, and Fuderer et al. while maintaining their high performance have been revealed in U.S. Pat. No. 4,761,165 to Stöcker and in U.S. Pat. No. 6,146,450 to Duhayer et al.

Several PSA systems have been presented that reduce mechanical complexity through the implementation of rotary valving arrangements by combining many valve functions from earlier processes to reduce complexity. Examples of such systems include U.S. Pat. No. 4,272,265 to Snyder, U.S. Pat. No. 4,925,464 to Rabenau et al., and U.S. Pat. No. 6,063,161 to Keefer et al. In each ease the use of one or more rotating assemblies with valving functionalities are employed in place of one or more independent valves. Although these methods advantageously reduce the plumbing complexity compared to independent valves plumbed in a traditional manner, they have several undesirable features. First, they fix the relative duration of the various PSA cycle steps, and are thus unable to respond to changes in flow conditions to optimize operation with variability in feedstock composition, temperature, pressure or flowrate. Keefer et al. describe the addition of special secondary valves to their basic rotary valves in order to fine tune the PSA cycle, which undesirably increase complexity and are not adjustable during operation. Second, all rotating valves rely on sliding sealing surfaces to separate purified product from impure feed or waste gases. Indeed, Keefer et al. teach elaborate mechanical steps needed to overcome this potential limitation to product purity. Sliding seals are more difficult to maintain, provide worse sealing, and are more susceptible to damage due to particle contamination than simple contact seals without sliding. Finally, the rotating valve arrangements make very complex cycles difficult to execute because of the complexity of the rotary valve porting arrangements required for their implementation. These valves have, therefore, chiefly been used to implement simple cycles with relatively low product recovery and adsorbent utilization compared to the most advanced cycles taught in the art.

An additional feature present in many PSA cycles of the art is the use of countercurrent blowdown of an adsorbent vessel with purified product gas. In early cycles such as that of Batta or Fuderer et al., this was accomplished by providing an independent product gas manifold maintained at a low pressure via a pressure regulating valve or throttling device, with an independent actuated valve provided for each adsorbent vessel. Alternatively, some simple cycles were provided with a flow control valve connecting the product manifold to each vessel. An example of this method is described in U.S. Pat. No. 4,194,890 to McCombs. This simplified method has the disadvantage that the flow of product gas through the vessel cannot be independently controlled, which leads to a reduction in product recovery as compared to the traditional methods. A second improved approach using proportionally-controlled valves was taught by Stöcker. Although the method of proportional control of the product delivery valve does desirably reduce the number of plumbing connections relative to the art, and provides the ability to stop flow entirely at some stages in the cycle, proportional valves may suffer from lower reliability and higher cost than on-off valves.

The inventors of the present invention have determined that none of the pressure swing adsorption systems described in the above patents teaches any fundamental mechanical deviations from traditional construction using separately plumbed valves. The inventors have determined that the use of independently connected valves is highly undesirable, since each valve requires at least two plumbing connections. These connections are often made with expensive fittings, or through welding to ensure product purity and/or to prevent leakage of noxious or flammable process gases. This proliferation of fittings undesirably increases manufacturing expense, increases the packaged system volume, and reduces safety and reliability due to the possibility of leakage.

The proliferation of plumbing, and the attendant volume required for packaging, is further complicated by the requirement to provide mechanical support to the adsorbent vessels. The plumbing and valving, due to its relatively great mass, may exert considerable forces on the pressure vessels unless all are carefully designed and well-supported. The provision of such supports disadvantageously increases the system mass, volume, and manufacturing cost. Further, the adsorbent vessels, which are subject to fatigue failure due to the cyclic nature of the pressure stresses, are inherently difficult to support structurally without further increasing their weight to compensate for high localized stresses.

SUMMARY OF THE INVENTION

In an effort to eliminate the problems associated with other pressure swing adsorption (PSA) systems described above, the present invention provides a reliable, cost-effective pressure swing adsorption system as described below.

The present invention advantageously provides an improved mechanical apparatus for PSA that reduces mechanical complexity as compared to traditional methods irrespective of the number of adsorbent beds employed or the complexity of the underlying cycle. The invention reduces the mechanical complexity without sacrificing the ability to independently control the operation of the valving functions to optimize control of the system during operation. Furthermore, the invention reduces mechanical complexity without the need for sliding seals or rotating valves.

Additionally, the present invention advantageously provides an improved method for providing counter-current blow-down of an adsorbent vessel with pure product gas as well as co-current product delivery using a single actuated valve with on-off functionality. The invention also provides a novel apparatus for practicing the improved method of product gas flow control.

The present invention advantageously provides a novel apparatus for manifolding independently actuated valves directly to an adsorbent vessel.

The present invention provides that the novel manifolding apparatus may also advantageously serve as a location for the attachment of sensors, service ports, vent valves, relief valves, and other ancillary components considered advantageous to the operation of PSA cycles. The invention also provides that the novel manifolding apparatus can be used to physically support an adsorbent vessel. The invention further advantageously provides that the structural support accommodates thermal and pressure cycling of the vessel without imposing deleterious bending moments on the vessel.

The present invention advantageously provides an improved apparatus that can be used to practice four-bed PSA with two pressure equalizations and counter-current product purge using only sixteen actuated valves with on-off functionality.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 5b and 5c are enlarged areas of FIG. 5a;

DETAILED DESCRIPTION OF THE INVENTION

Embodiments of the present invention will be described hereinafter with reference to the accompanying drawings. In the following description, the constituent elements having substantially the same function and arrangement are denoted by the same reference numerals, and repetitive descriptions will be made only when necessary.

Figure 1:
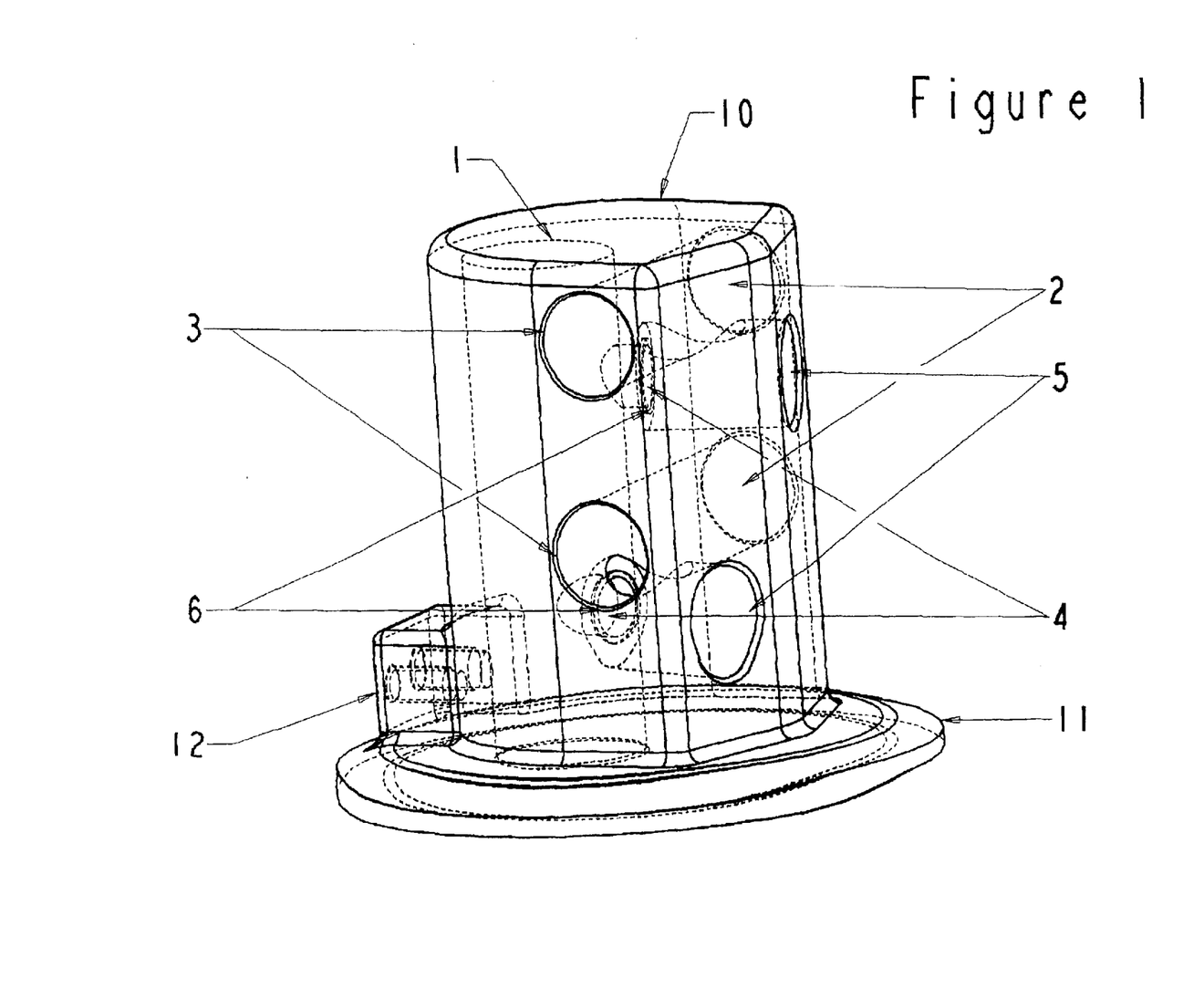
FIG. 1 depicts a valve manifold according to the present invention with hidden features denoted by dashed lines.

FIG. 1 depicts a three-dimensional, perspective view of the valve manifold 10 of the present invention. The valve manifold 10 is provided with at least one plenum cavity 1, which is in communication with an adsorbent vessel 20 (see FIG. 2). The manifold 10 is further provided with at least one fluid channel 2, which has at least one fluid inlet port 3. The plenum cavity 1 is in communication with fluid channel 2 via internal gallery or fluid passage 4. Note that the manifold 10 can include one or more channels 2 that are connected to one or more cavities 1 by one or more passages 4. A variety of different configurations will be readily apparent to one of ordinary skill in the art based upon the teachings set forth herein.

The flow of fluid through gallery 4 may advantageously be controlled by a valve mounted to valve port 5, and seated on valve seat 6. In the manifold of FIG. 1, a valve possessing a seat essentially concentric with the valve port 5 is provided. Valves of the types commonly referred to as piston, plunger, needle, and globe possess this linear relationship. Although other types of valves may be used with the manifold of the present invention, valves having a seat concentric with the valve port are preferred. Valves where the entire valve body is attached in an integral fashion are especially preferred. Examples of these valves are plunger, piston, needle and certain types of globe valves. Piston type valves are especially preferred.

It can be seen from FIG. 1 that more than one fluid channel 2 may be incorporated in the valve manifold 10. In fact, any number of fluid channels can be incorporated into the valve body of the valve manifold 10. Furthermore, each fluid channel may be provided with one or more fluid ports 3, and each fluid channel may be provided with additional features or ports to accept sensors, instruments, pressure relief valves or other appurtenances deemed necessary for the operation of the PSA cycle. Additionally, the other areas of the manifold may be provided with such features which communicate either with the plenum 1 or with the interior of the pressure vessel 20 directly. It may be desirable to provide an access port for servicing valves that are assembled from below the valve seat, such as many types of globe valves.

The valve manifold 10 depicted in FIG. 1 may be fabricated by casting, machining, powder metallurgy, forging, or any combination of processes known to the art. Furthermore, the valve manifold 10 may be of any material suitable for the operating conditions of the cycle in question.

FIG. 1 depicts a valve manifold 10 having two fluid channels 2 in parallel, where both channels 2 are mounted on the same side of the plenum 1. The fluid channels 2 may be mounted in any position relative to the plenum 1 that facilitates proper gallery and valve function. The position of the fluid channels 2 can be dictated by overall adsorbent bed packaging, PSA cycle configuration, valve access, structural support, or other factors.

The valve manifold 10 of FIG. 1 has two fluid channels 2 in parallel that communicate in parallel with a common plenum cavity 1 that is in communication with the adsorbent vessel 20. Accordingly, the valve manifold provides a configuration that can adequately execute the adsorbent bed inlet functions described in the PSA cycles of the Wagner, Batta, Fuderer et al., and Stöcker patents. However, it is evident that the valve manifold 10 of the present invention requires only four interconnections per adsorbent vessel to accomplish this task, instead of the at least seven connections required in the traditional constructions. Furthermore, the internal volume of the valve manifold 10 of the present invention is advantageously reduced as compared to the conventional pipe connections of the art. This reduction in volume improves product recovery in PSA cycles.

The valve manifold 10 of FIG. 1 is provided with at least one mounting boss 12. The mounting boss 12 allows connection to the adsorbent vessel in an area of low stress, thus allowing the vessel walls to be made advantageously thinner than in other methods of support. The mounting boss can be placed in any location which is convenient in the configuration being considered based upon considerations of valve access for service, compactness of packaging, ease of manifold fabrication, and other factors.

The valve manifold 10 of FIG. 1 is preferably provided with an attachment means 11 that is used to join the manifold 10 to the pressure vessel 20. In FIG. 1, the attachment means 11 is well-adapted for joining via welding, brazing, soldering, or adhesive bonding.

Figure 2:
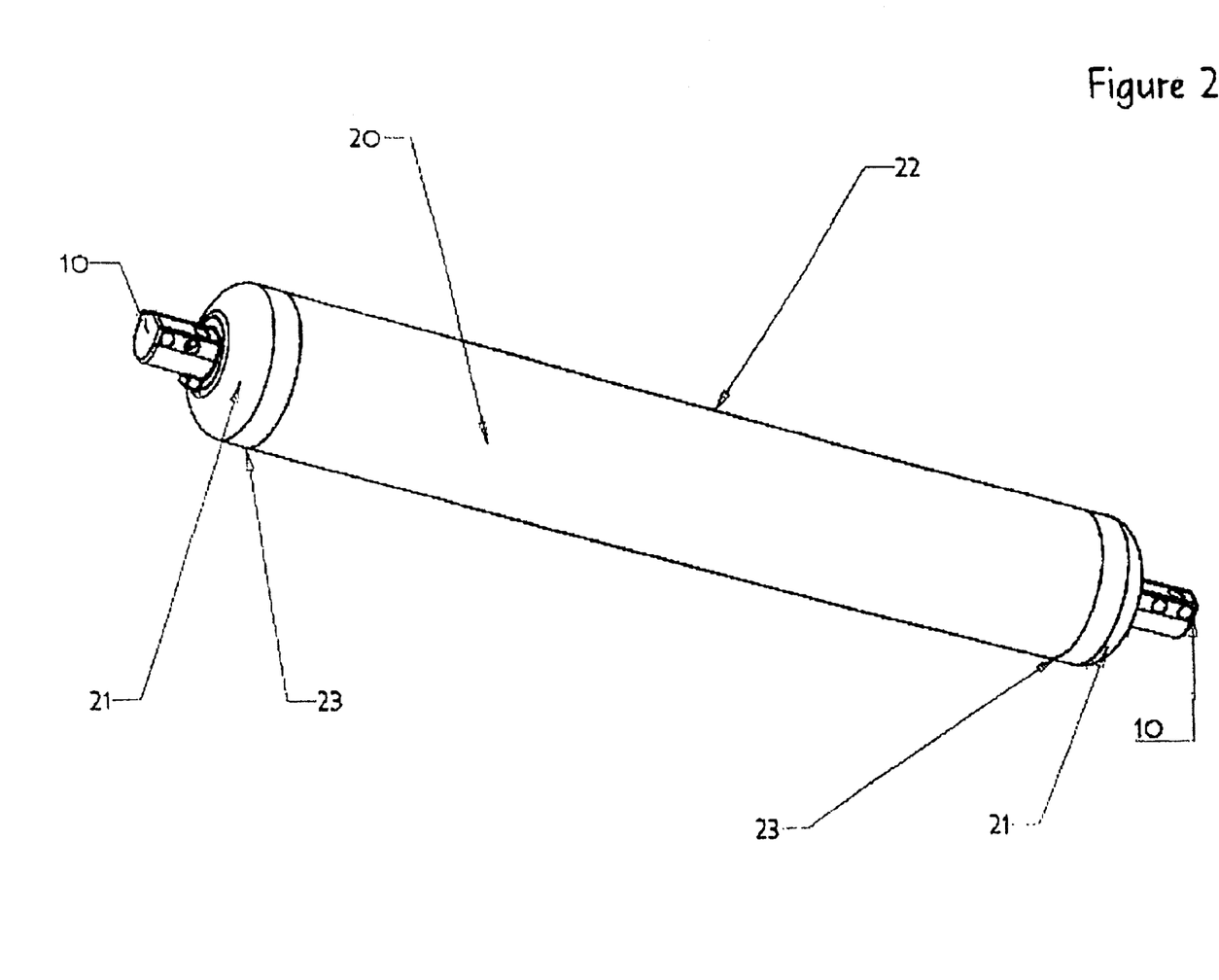
FIG. 2 depicts an adsorbent vessel with two manifold assemblies according to the present invention.

FIG. 2 depicts an adsorbent vessel 20 provided with a manifold 10 of the present invention on each end. The manifolds 10 may be attached by welding, brazing, soldering, adhesive bonding or by other similar means. Alternatively, the manifolds 10 may be joined to the vessel 20 by means of a bolted flange, screwed connection, breech block connection, snap ring, or by various other non-permanent means. Such a removable connection advantageously allows the adsorbent to be inspected and/or removed more readily than the permanent connections, but may also undesirably increase vessel size, weight and manufacturing cost such that neither method is clearly preferred.

The adsorbent vessel of FIG. 2 is pictured with domes 21 connected to a cylindrical section 22 at joints 23. This embodiment is not intended to limit the present invention in any way. The vessel 20 may have any cross sectional shape. The joints 23 may be formed by welding, brazing, adhesive bonding or other methods, or may be provided with flanges or other removable connections. Furthermore, the entire vessel 20 may be formed as a unitary body by swaging, forging, casting, filament winding, or by other similar means. The adsorbent vessel may also be mechanically joined to other adsorbent vessels, surge tanks, intermediate adsorbent vessels, structures, or other features to form a composite vessel. Thus, the form of the adsorbent vessel does not limit the practice of the present invention in any way.

Figure 3:
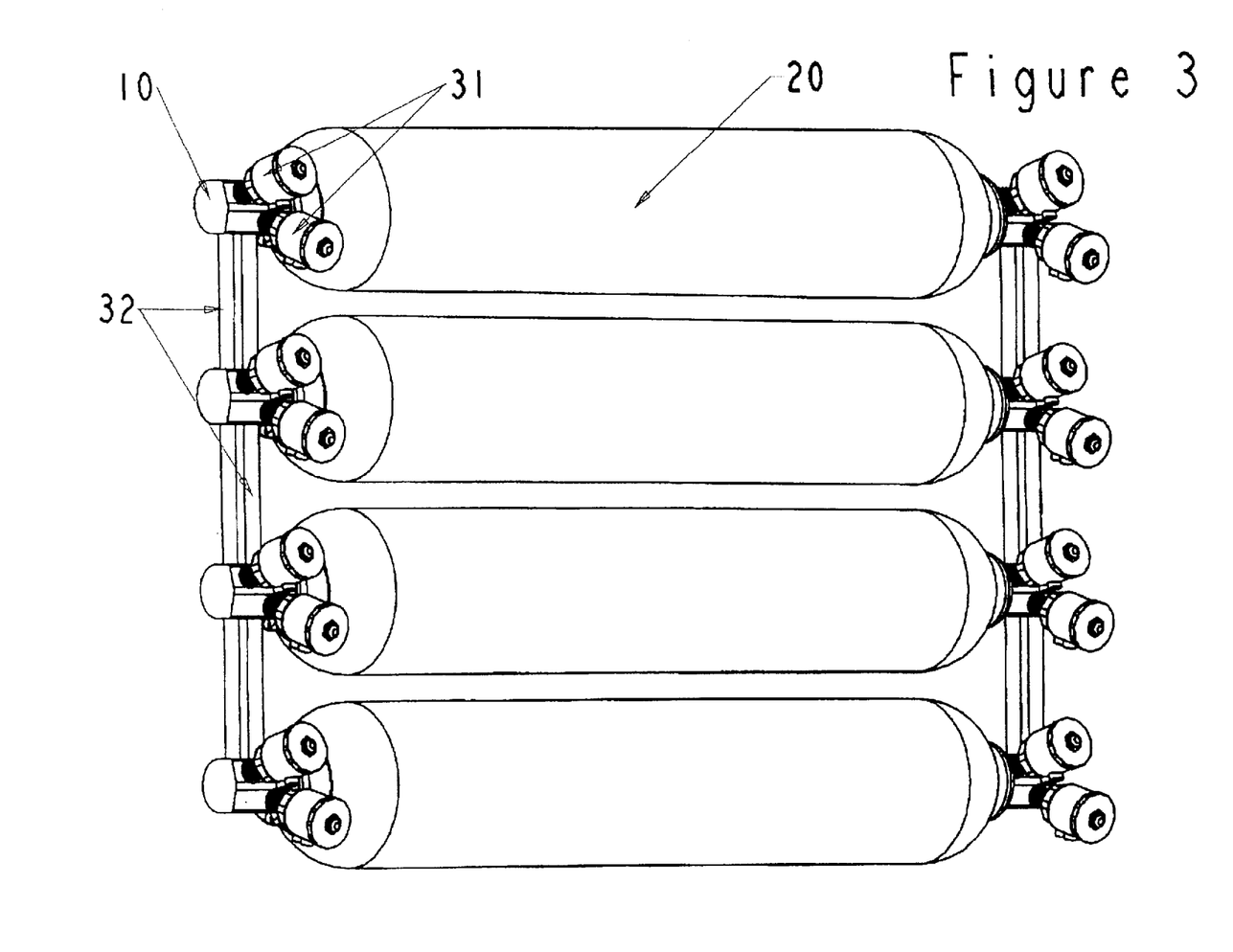
FIG. 3 depicts an apparatus for operating a four adsorbent vessel pressure swing adsorption cycle using the manifold features of the present invention.

FIG. 3 depicts four adsorbent vessels 20 forming a PSA system. In FIG. 3, each valve manifold 10 is provided with two valves 31. Each fluid channel can communicate with every other vessel via fluid connectors 32. The fluid connectors 32 can be rigid pipes as shown here, or may be compliant, flexible tubing. In fact, the functional form of the interconnecting fluid connectors does not limit the practice of the present invention in any way, and may be chosen based upon the conditions of the process in question. Further, the fluid connectors can be joined to the manifolds 10 either permanently, or via removable connectors.

It can be appreciated by reviewing the figures that each fluid channel, combined with the fluid connectors 32, form a continuous fluid pathway between the valves and plenums of each adsorbent vessel. Thus, any cycle which contemplates fluid exchange between vessels operating at different points in the PSA cycle may be implemented with the manifolds of the present invention. If it is so desired, the manifolds may be integrated into one or more larger manifolds which communicate with two or more individual adsorbent vessels. Such an integrated manifold could completely eliminate the fluid connectors 32. The integrated manifolds can be manufactured by casting, molding, machining and other techniques and combinations of techniques. Because the physical extent of the integrated manifolds is related to the size of the adsorbent vessels, the preferred manifestation of the manifolds depends upon the detailed feasibility and economics of each system. Thus, independent manifolds may be preferred for systems of relatively large vessel diameter, whereas integrated manifolds communicating with two or more vessels may be preferred for vessels of small diameter.

Therefore, the present invention specifically contemplates PSA systems with integral manifolds and vessels, all of which may alternatively be formed in a single component, or in many components, where the independent valve elements communicate with the adsorbent vessels in such a way to implement virtually any PSA cycle which contemplates parallel connection between vessels for exchange of fluid during different phases of the PSA cycle. Although FIG. 3 illustrates piston valves with pneumatic actuation, other types of valves are contemplated herein. The valves may be actuated pneumatically, electromagnetically, hydraulically, or via mechanical drive by camshafts, gear trains, or other means. Direct mechanical actuation may be preferred in small systems with integral manifolds communicating with many adsorbent vessels; as such systems lend themselves to the close mechanical tolerances required for successful operation via mechanical drive. Valves where the axis of motion is parallel to the valve port are preferred. Valves where the axis of motion is concentric with both the valve port and the valve seat are especially preferred.

Figure 4:
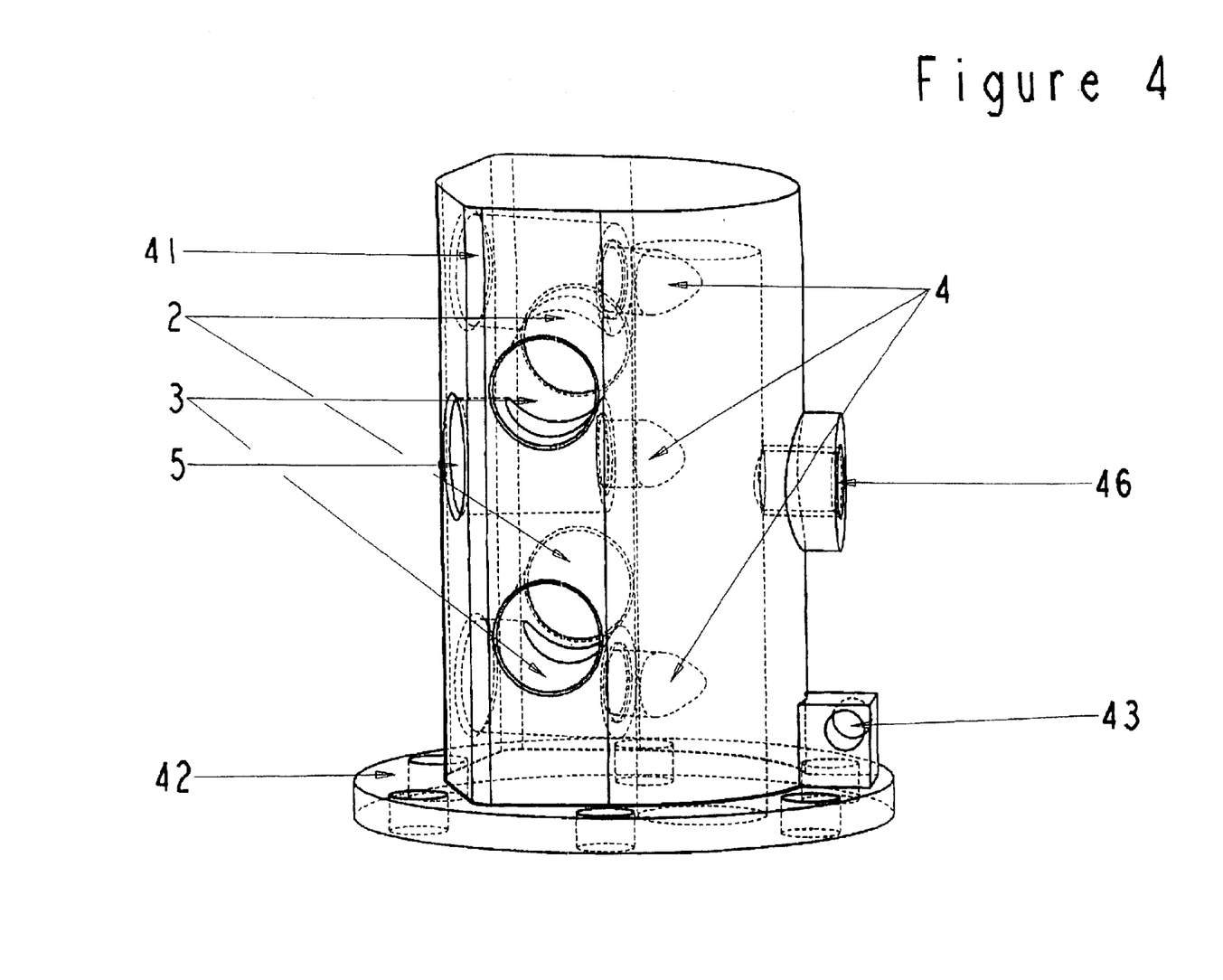
FIG. 4 depicts an alternative manifold apparatus of the present invention mounting three valves and having a bolted flange feature.

FIG. 4 illustrates another embodiment of the manifold of the present invention which is well adapted to practicing cycles with counter-current purge or blowdown using product gas such as those of Wagner, Batta or Fuderer et al. In this embodiment of the present invention, one or more fluid channels 2 communicate with a first valve port 5 for the delivery of pure product during the adsorption stage of the PSA cycle and a second valve port 41 for the control of counter-current purge or blowdown gas from the product manifold. In FIG. 4, the ports 5 and 41 are depicted as having equal dimensions; however, alternatively the two ports may be different in dimension to accept valves of different sizes and/or type in order to achieve proper product flow performance. The embodiment of FIG. 4 would advantageously employ piston valves with adjustable valve travel stops, which may be used to adjust the flow characteristics of the piston valve to achieve proper PSA cycle performance.

FIG. 4 also depicts a sensor port 46 that can be used to receive a sensor used in the operation and maintenance of the PSA system. The sensor port 46 depicted in FIG. 4 is connected to the plenum cavity 1. However, sensor ports can also be connected to the channels 2 and/or the passages 4, depending upon the specific measurement being taken in the PSA system.

The valve manifold of FIG. 4 also embodies a bolted flange interface 42. The flange interface 42 connects the valve manifold to the vessel 20 by threaded connections, such as bolts or studs. Such a connection desirably facilitates removal of the valve manifold to facilitate adsorbent inspection or replacement. Although a bolted flange is illustrated in FIG. 4, other types of removable connections are contemplated by the inventors, such as integral threaded connections, breech block connections, snap rings, and other similar means.

An additional preferred feature depicted in FIG. 4 is a structural support boss with a pin journal 43. The pin journal 43 provides a means to support the vessel via a pinned connection. Connectors, such as pin journal 43, support loads, but not moments. By providing a pinned connection at each end of the adsorbent vessel 20, the vessel may be attached to a support structure by one or more yokes, or bar linkages. Preferably, one end of the vessel will be attached to the support structure by a pinned connection, whereas the second end of the vessel will be attached via a yoke or bar linkage. The vessel 20 (see FIGS. 2 and 3) therefore forms an element in a three bar linkage.

Figure 5A:
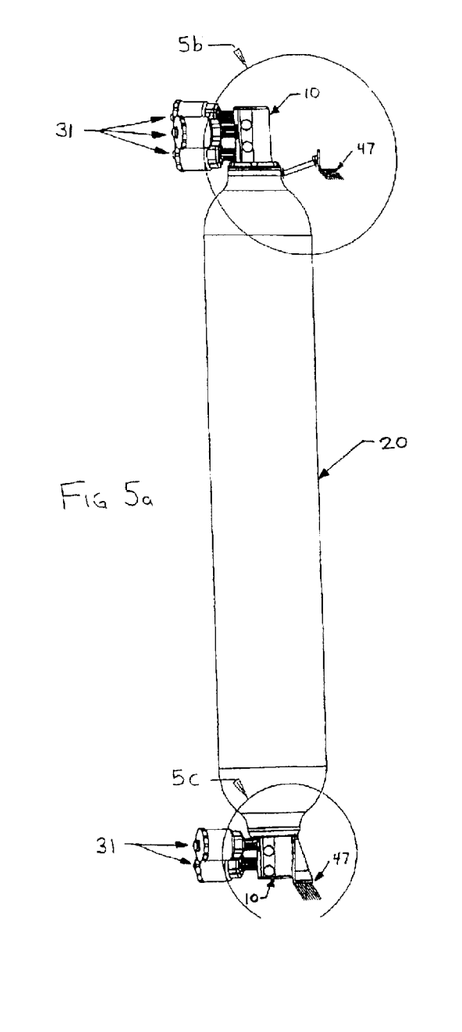
FIG. 5a depicts an adsorbent vessel with two manifold assemblies mounted to a supporting structure.
Figure 5B:
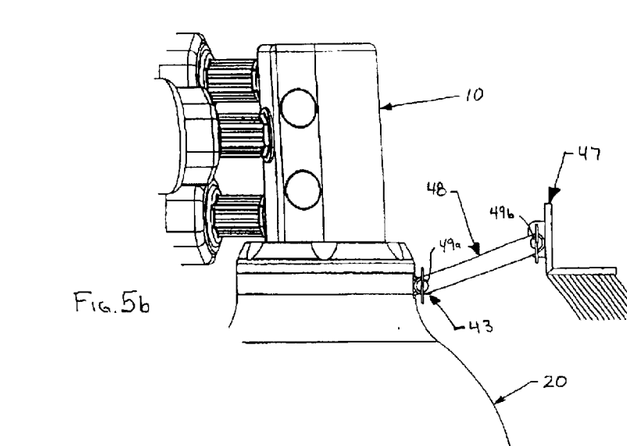
Figure 5C:
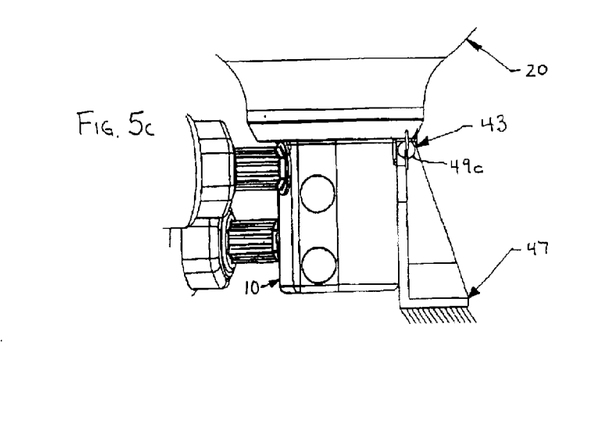

FIGS. 5a, 5b, and 5c depict an adsorbent vessel 20 having a valve manifold 10 mounted on both ends thereof. FIG. 5b depicts an enlarged view of one end of the vessel 20 in which a valve manifold 10 is attached via a pin journal 43 to a rigid linkage 48 and the linkage 49 is connected to a supporting structure 47. The pin journal 43 is rotatably connected to the linkage 48 by pin 49a, and the linkage 48 is rotatably connected to the supporting structure 47 by pin 49c. FIG. 5c depicts an enlarged view of the opposite end of the vessel 20 in which a valve manifold 10 is attached via a pin journal 43 directly to the support structure 47. The manifold 10 in FIG. 5c is rotatably connected to the supporting structure 47 by pin 49c. Accordingly, the adsorbent vessel 20 depicted in FIGS. 5a, 5b, and 5c forms an element in a three bar linkage.

A three bar linkage can accommodate change in the length of the vessel by rotation of the vessel. This type of attachment offers several advantages over a rigid support via welding or bolting. First, the preferred three bar linkage mounting accommodates changes in vessel length occasioned by cycles in vessel pressure and/or temperature. Such changes in length cannot be avoided in PSA systems, and undesirably create reaction loads in the vessel and the rigid support means. A second advantage of the three bar structural support of the present invention is that it does not transmit moments between the vessel and the support. Thus, loads placed on the vessel and/or structure due to vessel weight, wind loads, earthquake, or other factors do not result in bending of the vessel or manifold. This configuration desirably reduces stresses on the vessel and manifold, reduces the required strength and stiffness of both the vessel and manifold, and simplifies the design of the vessel, manifold and the support structure.

Figure 6A:
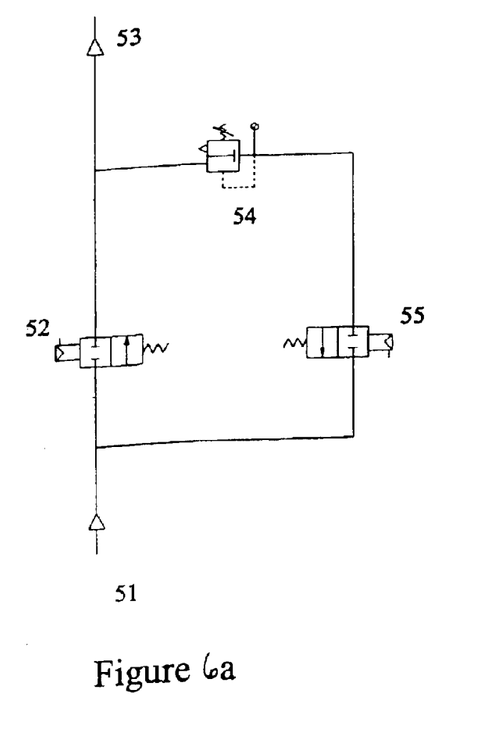
FIGS. 6a and 6b are flow schematics illustrating a principal of operation of an improved method of controlling product delivery and counterflow purge using one actuated valve.

FIG. 6a is a fluid flow schematic representing the control of purified, pressurized product gas from the product end of an adsorbent vessel in the processes of Wagner, Batta and Fuderer et al. During the adsorption stage of the PSA cycle, purified product flows from the product end of the PSA vessel through a conduit 51, and through a valve 52 to an outlet 53. Valve 52 is illustrated here as a one way, normally-closed, air actuated valve, but other types of valves can be employed. During other stages of the PSA process after the adsorption stage has been completed, it is often the case that purified product gas may advantageously be used to cleanse the adsorbent vessel in a counter-current flow step. In the art, this is usually accomplished by regulating the product pressure down to an intermediate pressure using pressure regulator 54, then admitting this regulated gas stream through a second valve 55. In this sort of system, each vessel is provided with two valves corresponding to valves 52 and 55 in FIG. 6a, and the system is provided with one regulating valve 54. The provision of these valves in art systems undesirably increases the plumbing complexity and expense, and also increases the complexity of the control system, which must be provided with extra capacity to actuate these valves. The problem of this complexity was addressed by Stöcker by providing a single adjustable valve. However, adjustable valves are much more expensive than on-off valves, and are thus undesirable for systems where valve costs are significant.

Figure 6B:
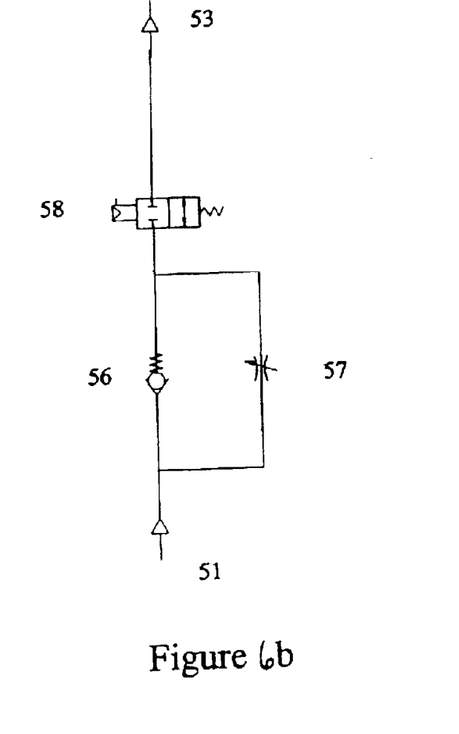

FIG. 6b depicts an alternative product gas flow control system of the present invention. During the adsorption stage in the improved method the product gas flows through the inlet 51 and through a non-return valve 56 in parallel with a metering orifice 57. The product then flows through the actuated on/off valve 58 to the product outlet 53. The non-return valve is illustrated in the diagram as a spring-return valve, although any type of non-return valve may be employed. During the counter-current flow step of the cycle, the on-off valve 58 is opened, and the product gas in the product manifold flows from the point 53, through the open on/off valve 58, through the metering orifice 57, into the adsorbent vessel, which is at a lower pressure than the product manifold, through point 51. The non-return valve 56 does not allow reverse flow, so the flowrate of the counter-flowing gas may be completely controlled by the metering orifice 57. In the third operational state of this assembly, the on/off valve 58 is closed, and flow between the adsorbent vessels does not occur, irrespective of their relative pressures.

The functions of the non-return valve 56 and the metering orifice 57 may be combined into a single component, such as in a flow-control valve. The combination of the flow control valve and an on-off valve offers less actuation complexity, fewer interconnections, and less cost than other systems. Further simplification results by replacing the variable orifice feature illustrated in FIG. 6b with a fixed orifice.

Figure 7:
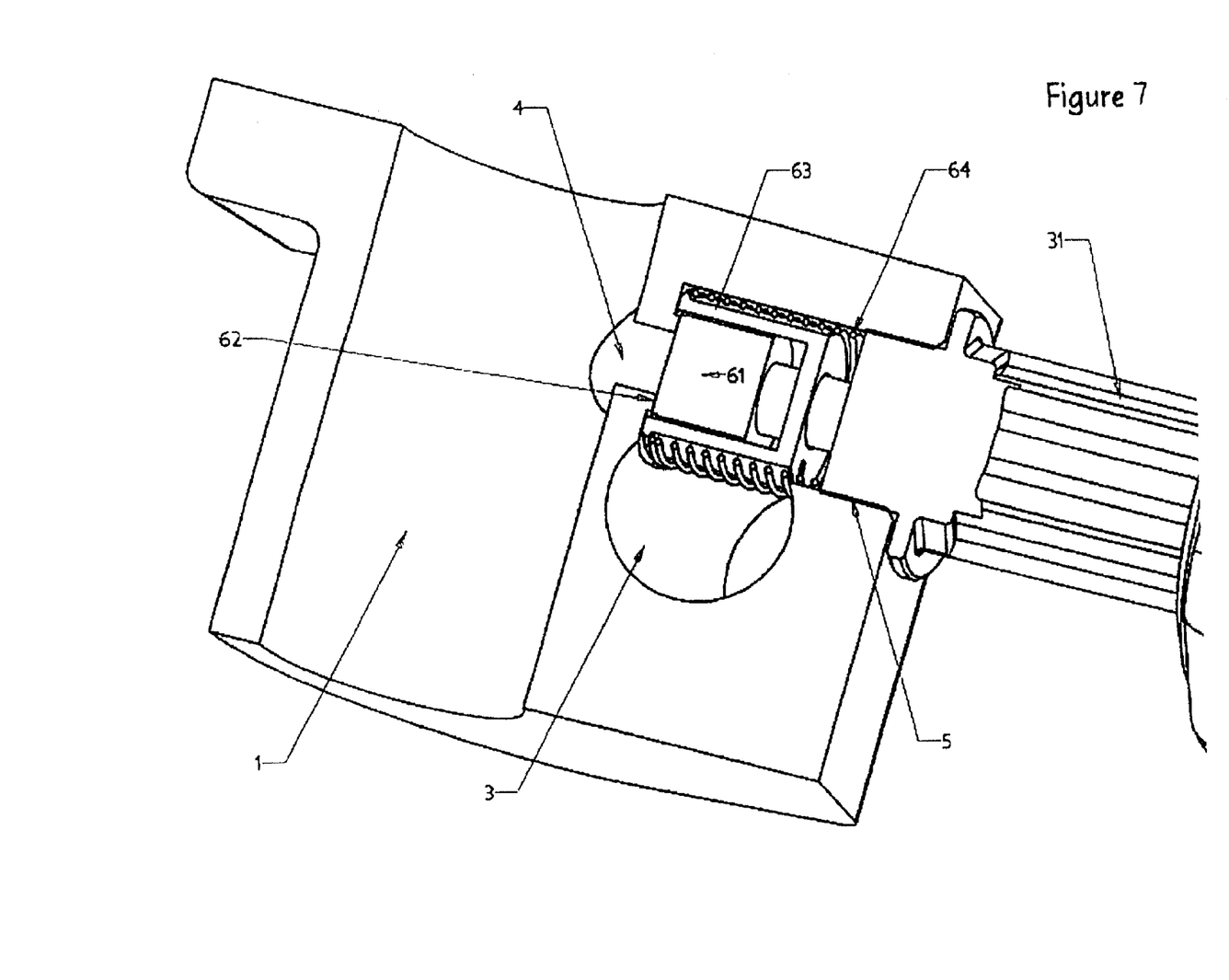
FIGS. 7, 8, and 9 depict cross-sectional views of an embodiment of an apparatus used to practice the method detailed in FIG. 6b, where the valving apparatus is depicted in three distinct operational modes.

The improved product flow control method of the present invention may advantageously be combined with the manifold apparatus of the present invention to form a highly simplified apparatus for controlling product gas flow. In such a configuration, the same types of on/off valves are utilized, however a non-return valve must be interposed between the fluid channel 2 and the plenum 1, which communicates with the adsorbent vessel 20. Several types of suitable compact non-return valves are known in the art, including reed valves and cartridge valves. FIG. 7 illustrates a section view of the valve manifold assembly of the present invention including an especially-preferred embodiment of the non-return valve. As depicted in the cross-sectional view of FIG. 7, the on-off valve 31 is inserted into the valve port 5. The valve stem and seal 61, shown in a simplified form here, are in contact with a valve seat 62. In this position, the valve seal and seat prevent flow between the fluid channel 2 and the plenum 1 through the internal gallery 4. The especially-preferred non-return valve of the present invention comprises a seal cup 63, which encloses the valve seal 61, and a seal spring 64 which biases the seal cup against the seat area.

Figure 8:
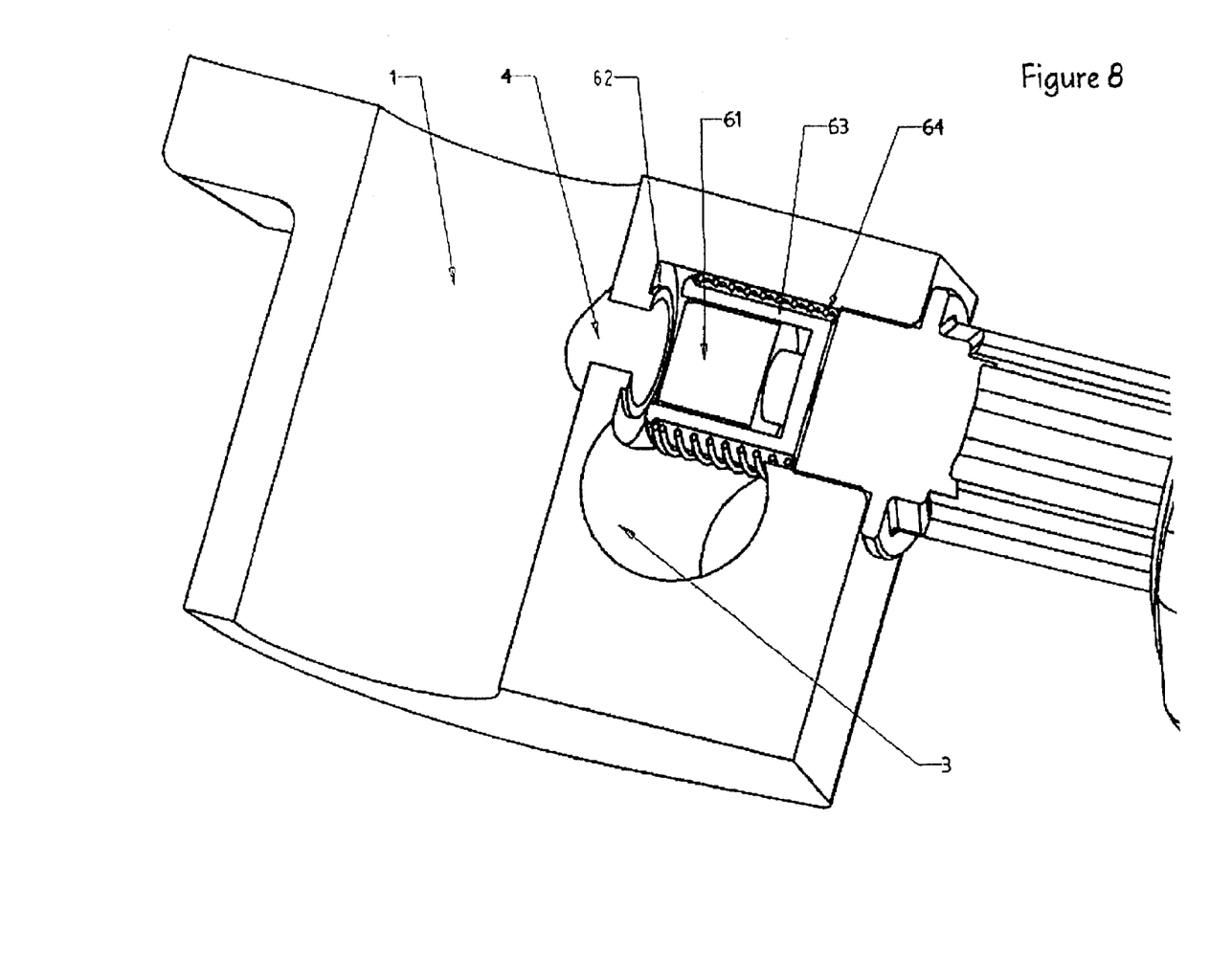

FIG. 8 shows another cross-sectional view of the manifold depicted in FIG. 7 including the depiction of the non-return valve of the present invention during the adsorption step while pressurized, purified product gas is flowing from the plenum 1, through the gallery 4 into the fluid channel 2. In this configuration, the on/off valve seal assembly 61 has been lifted by the valve actuator, and the seal cup 63 has been lifted off of the seat area 62 by fluid pressure force. The seal spring 64 is compressed by the pressure force. Selection of the seal spring determines the resistance to flow of the assembly, and thus the pressure drop through the assembly. Seal springs having low stiffness are preferred to confer a low pressure drop to the non-return valve assembly.

Figure 9:
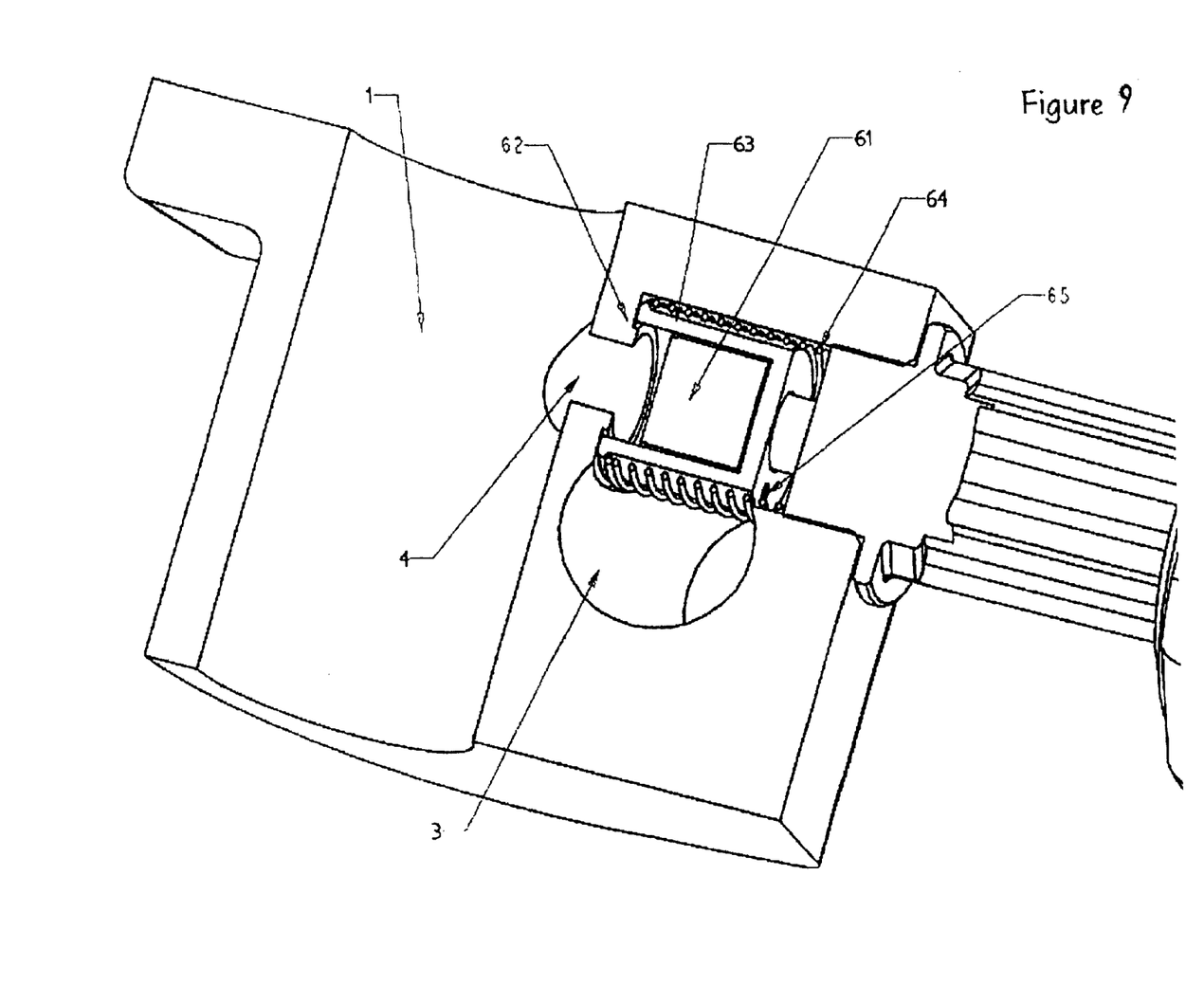

FIG. 9 shows another cross-sectional view of the manifold depicted in FIGS. 7 and 8 including the depiction of the non-return valve of the present invention during the counter-current flow step of the PSA cycle. During this step, the product pressure in the fluid channel 2 is higher than the pressure inside the plenum 1. Thus, there is no pressure force to lift the seal cup 63 off of the seat area 62 against the spring 64. The on/off valve seal 61 is lifted off the seat area by its actuator. A flow metering orifice 65 is provided in the seal cup 63 to allow product flow from the channel 2 to the plenum 1. The flow metering orifice 65 can be formed in the shape of one or more ports as depicted in FIGS. 7–9, or the flow metering orifice can be constructed by providing clearance between the valve stem and the seal cup, or by providing gaps, holes or other features at the juncture of the seal cup and the seat area. Any combination of these configurations can also be employed as a flow metering orifice according to the present invention. The especially-preferred embodiment of the non-return valve depicted here has the particular advantage of using only two parts, each of which has a simple shape and can be readily manufactured.

Note that the valves of the present invention are configured to not restrict flow along the channel and to not restrict flow within the cavities. The valves are configured to merely control the flow of fluid between the cavities and the channels via the passages. Accordingly, if any given valve fails, then the flow along the channel and the flow within the cavity can be maintained if desired.

Using any of the above embodiments, the method of the present invention for controlling product flow advantageously reduces the number of actuated valves as compared to the teachings of the Wagner, Batta, Fuderer et al. and other PSA systems. This reduction in valve count reduces cost and complexity while increasing reliability. It also reduces the complexity of the PSA control system.

The manifold apparatus of the present invention materially improves any PSA system in a number of ways. First, the product recovery at given operating conditions is increased due to the precipitous decrease in dead volume in plumbing and manifolding between valves. Secondly, the mechanical complexity of the valving assembly is reduced, with a corresponding decrease in the difficulty of manufacture and the probability of leaks. Third, the reduction in the valving and plumbing mass and volume decrease the footprint and mass of the PSA system, results in a decrease in mechanical loads imposed upon the adsorbent vessels and the need for support structure. Furthermore, the manifold assemblies provide a means of structural support using pinned connections which eliminates moments between the support structure and the adsorbent vessel. The elimination of these moments advantageously reduces the stresses on the vessel, resulting in reductions in vessel material usage needed in order to attain adequate lifetime.

The use of a manifold apparatus of the present invention, which combines flow conduit features and valve porting for more than one vessel, can further reduce overall complexity, volume and mass as compared to other systems. Further, such integral manifolds make valve actuation via mechanical means such as a camshafts or gear trains feasible, thereby further decreasing control system complexity and cost. In the preferred embodiments of the manifold apparatus of the present invention using valves with linear motion between the seal and seat, these advantages are offered while eliminating sliding seals employed in rotary valving systems. The elimination of sliding seals facilitates improved product recovery and purity and increased reliability. Furthermore, if the valves are independently actuated, a PSA system of the present invention may be optimized for varying feed conditions during operation.

When the improved product flow control method of the present invention is combined with the manifold apparatus of the present invention, the PSA system is further improved. These improvements include a reduction in actuated valve usage, a reduction in control system complexity, an increase in reliability, and a dramatic decrease in system manufacturing complexity and cost.

The most salient feature of the method and apparatus of the present invention is their broad applicability to almost all PSA systems. Furthermore, both the apparatus and method may be advantageously applied in PSA systems of any production capacity. The entire disclosure of each of U.S. Provisional App. Ser. No. 60/214,737, filed Jun. 29, 2000, and U.S. patent application Ser. No. 09/588,575, filed Jun. 7, 2000; Ser. No. 09/642,008, filed Aug. 21, 2000; Ser. No. 09/928,437, filed Aug. 14, 2001; Ser. No. 10/097,745, filed Mar. 15, 2002; and U.S. patent application Ser. No. 10/269,064 entitled HIGH RECOVERY PSA CYCLES AND APPARATUS WITH REDUCED COMPLEXITY by Franklin D. Lomax, Jr. filed on Oct. 11, 2002, are incorporated herein by reference in their entirety.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of performing pressure swing adsorption comprising the steps of:

providing a valve manifold having a cavity, a passage and a channel, the cavity being fluidly connected to an opening of an adsorbent vessel, the passage connecting the channel to the cavity, wherein the valve manifold includes a valve provided within the passage, the valve being configured to selectively permit and restrict flow between the channel and the cavity via the passage, the valve comprising a non-return valve, a metering orifice provided in parallel with the non-return valve, and an on/off valve provided in series with the non-return valve and the metering orifice, wherein product gas flows out of the adsorbent vessel through the non-return valve, the metering orifice and the on/off valve during an adsorption stage, wherein the product gas flows through the on/off valve and the metering orifice and into the adsorbent vessel during a counter-current flow stage, and wherein flow to and from the adsorbent vessel ceases when the on/off valve is closed.

2. The method according to claim 1, wherein the valve manifold comprises at least one additional valve configured to control fluid flow from the cavity to the channel that is connected to another adsorbent vessel.

3. The method according to claim 1, wherein:
the non-return valve comprises a seal cup configured to receive the on/off valve therein;
the metering orifice is provided through the seal cup; and
the seal cup is spring biased toward a valve seat provided in the passage.

4. The method according to claim 1, wherein the on/off valve is linearly actuated in contact with and out of contact with a valve seat provided in the passage.

5. A valve manifold for a pressure swing adsorption system having at least one pressure vessel, said valve manifold comprising:
a body having a first cavity, a first passage and a first channel, said first cavity being adapted to fluidly connect to the at least one pressure vessel, said first passage connecting said first channel to said first cavity;
a first valve provided within said first passage, said first valve being configured to selectively permit and restrict flow between said first channel and said first cavity via said first passage;
a second cavity in said body adapted to fluidly connect to another pressure vessel, said body having a second passage connecting said first channel to said second cavity; and
a second valve provided within said second passage, said second valve being configured to selectively permit and restrict flow between said first channel and said second cavity;
wherein said first valve is configured to not restrict flow along said first channel.

6. The valve manifold according to claim 5, wherein:
said body has a third passage and a second channel, said third passage connecting said second channel to said first cavity; and
said valve manifold further comprises a third valve provided within said third passage, said third valve being configured to selectively permit and restrict fluid flow between said second channel and said first cavity.

7. The valve manifold according to claim 6, wherein said first channel and said second channel are configured to provide a parallel flow connection to said first cavity.

8. The valve manifold according to claim 6, wherein said first channel and said second channel are connected to a same side of said first cavity.

9. The valve manifold according to claim 5, wherein:
said body has a third passage connecting said first channel to said first cavity; and
said valve manifold further comprises a third valve provided within said third passage, said third valve being configured to selectively permit and restrict fluid flow between said first channel and said first cavity via said third passage.

10. The valve manifold according to claim 9, wherein:
said body has a second channel and a fourth passage, said fourth passage connecting said second channel to said first cavity; and
said valve manifold further comprises a fourth valve provided within said fourth passage, said fourth valve being configured to selectively permit and restrict fluid flow between said second channel and said first cavity via said fourth passage.

11. The valve manifold according to claim 5, wherein:
said body has a second channel, a third passage and a fourth passage, said third passage connecting said second channel to said first cavity, said fourth passage connecting said second channel to said second cavity;
said valve manifold further comprises a third valve provided within said third passage, said third valve being configured to selectively permit and restrict flow between said second channel and said first cavity; and
said valve manifold further comprises a fourth valve provided within said fourth passage, said fourth valve being configured to selectively permit and restrict flow between said second channel and said second cavity.

12. The valve manifold according to claim 11, wherein said first channel and said second channel are configured to provide a parallel flow connection between said first cavity and said second cavity.

13. The valve manifold according to claim 5, wherein said second valve is configured to not restrict flow along said first channel.

14. The valve manifold according to claim 5, wherein said first valve is configured to not restrict flow within said cavity.

15. The valve manifold according to claim 5, wherein said body further comprises a sensor port connected to said cavity.

16. The valve manifold according to claim 5, wherein said body further comprises a sensor port connected to said first passage.

17. The valve manifold according to claim 5, wherein said body further comprises a sensor port connected to said first channel.

18. The valve manifold according to claim 5, wherein said first passage includes a valve seat and a valve port in which said first valve is received.

19. The valve manifold according to claim 18, wherein said valve seat is concentric with said valve port.

20. The valve manifold according to claim 5, wherein said first valve includes a valve seal configured to be selectively actuated between a sealed contact position with a valve seat in said first passage wherein said first channel is sealed from said first cavity and a non-contact position with said valve seat, said first valve further including a secondary seal member having a metering orifice.

21. A valve manifold for a pressure swing adsorption system having at least one pressure vessel, said valve manifold comprising:
a body having a first cavity, a first passage and a first channel, said first cavity being adapted to fluidly connect to the at least one pressure vessel, said first passage connecting said first channel to said first cavity;
a first valve provided within said first passage, said first valve being configured to selectively permit and restrict flow between said first channel and said first cavity via said first passage, wherein;

said valve manifold is adapted to be rigidly connected to the at least one pressure vessel; and said valve manifold further comprises a mounting boss having a pin journal adapted for connection to a support structure.

22. A valve manifold for a pressure swing adsorption system having at least one pressure vessel, said valve manifold comprising:

a body having a first cavity, a first passage and a first channel, said first cavity being adapted to fluidly connect to the at least one pressure vessel, said first passage connecting said first channel to said first cavity;

a first valve provided within said first passage, said first valve being configured to selectively permit and restrict flow between said first channel and said first cavity via said first passage, wherein said first valve comprises:
a non-return valve;
a metering orifice provided in parallel with said non-return valve; and
an on/off valve provided in series with said non-return valve and said metering orifice.

23. The valve manifold according to claim 22, wherein:
said non-return valve comprises a seal cup configured to receive said on/off valve therein;
said metering orifice is provided through said seal cup; and
said seal cup is spring biased toward a valve seat provided in said first passage.

24. The valve manifold according to claim 22, wherein said first valve includes a motive device configured to linearly actuate said on/off valve in contact with and out of contact with a valve seat provided in said first passage.

25. A valve manifold for a pressure swing adsorption system having at least two pressure vessels, said valve manifold comprising:

a body having a first cavity, a first passage and a channel, said first cavity being adapted to fluidly connect to one of the at least two pressure vessels, said first passage connecting said channel to said first cavity, said body having a second cavity and a second passage, said second cavity being adapted to fluidly connect to another of the at least two pressure vessels, said second passage connecting said channel to said second cavity;

first means for selectively permitting and restricting fluid flow between said channel and said first cavity ; and second means for selectively permitting and restricting fluid flow between said channel and said second cavity, wherein said first means is configured to not restrict flow along said channel.

26. A pressure swing adsorption system comprising:
a first pressure vessel having a first opening;
a second pressure vessel having a second opening; and
a first valve manifold comprising:
a first body having a first cavity, a first passage and a first channel, said first cavity being fluidly connected to said first opening of said first pressure vessel, said first passage connecting said first channel to said first cavity;
a first valve provided within said first passage, said first valve being configured to selectively permit and restrict flow between said first channel and said first cavity via said first passages;
a second cavity in said first body being fluidly connected to said second opening of said second pressure vessel, said first body having a second passage connecting said first channel to said second cavity; and a second valve provided within said second passage, said second valve being configured to selectively permit and restrict flow between said first channel and said second cavity.

wherein said first valve is configured to not restrict flow along said first channel.

27. The pressure swing adsorption system according to claim 26, wherein:
said first body has a third passage and a second channel, said third passage connecting said second channel to said first cavity; and
said first valve manifold further comprises a third valve provided within said third passage, said third valve being configured to selectively permit and restrict fluid flow between said second channel and said first cavity.

28. The pressure swing adsorption system according to claim 27, wherein said first channel and said second channel are configured to provide a parallel flow connection to said first cavity.

29. The pressure swing adsorption system according to claim 27, wherein said first channel and said second channel are connected to a same side of said first cavity.

30. The pressure swing adsorption system according to claim 26, wherein:
said first body has a third passage connecting said first channel to said first cavity; and
said first valve manifold further comprises a third valve provided within said third passage, said third valve being configured to selectively permit and restrict fluid flow between said first channel and said first cavity via said third passage.

31. The pressure swing adsorption system according to claim 30, wherein:
said first body has a second channel and a fourth passage, said fourth passage connecting said second channel to said first cavity; and
said first valve manifold further comprises a fourth valve provided within said fourth passage, said fourth valve being configured to selectively permit and restrict fluid flow between said second channel and said first cavity via said fourth passage.

32. The pressure swing adsorption system according to claim 26, wherein:
said first body has a second channel, a third passage and a fourth passage, said third passage connecting said second channel to said first cavity, said fourth passage connecting said second channel to said second cavity;
said first valve manifold further comprises a third valve provided within said third passage, said third valve being configured to selectively permit and restrict flow between said second channel and said first cavity; and
said first valve manifold further comprises a fourth valve provided within said fourth passage, said fourth valve being configured to selectively permit and restrict flow between said second channel and said second cavity.

33. The pressure swing adsorption system according to claim 32, wherein said first channel and said second channel are configured to provide a parallel flow connection between said first cavity and said second cavity.

34. The pressure swing adsorption system according to claim 26, wherein:
said first valve is configured to not restrict flow along said first cavity;
said second valve is configured to not restrict flow along said second cavity; and said second valve is configured to not restrict flow along said first channel.

35. The pressure swing adsorption system according to claim 26, further comprising:

a third pressure vessel having a third opening; and a fourth pressure vessel having a fourth opening, wherein said first body of said first valve manifold comprises:

a third cavity, a third passage, a fourth cavity and a fourth passage, said third cavity being fluidly connected to said third opening of said third pressure vessel, said third passage connecting said first channel to said third cavity, said fourth cavity being fluidly connected to said fourth opening of said fourth pressure vessel, said fourth passage connecting said first channel to said fourth cavity;

a third valve provided within said third passage, said third valve being configured to selectively permit and restrict flow between said first channel and said third cavity via said third passage; and a fourth valve provided within said fourth passage, said fourth valve being configured to selectively permit and restrict flow between said first channel and said fourth cavity via said fourth passage.

36. The pressure swing adsorption system according to claim 35, wherein:

said first valve is configured to not restrict flow along said first cavity;

said first valve is configured to not restrict flow along said first channel;

said second valve is configured to not restrict flow along said second cavity;

said second valve is configured to not restrict flow along said first channel;

said third valve is configured to not restrict flow along said third cavity;

said third valve is configured to not restrict flow along said first channel said fourth valve is configured to not restrict flow along said fourth cavity; and said fourth valve is configured to not restrict flow along said first channel.

37. The pressure swing adsorption system according to claim 26, wherein said second valve is configured to not restrict flow along said first channel.

38. The pressure swing adsorption system according to claim 26, wherein said first valve is configured to not restrict flow within said first cavity.

39. The pressure swing adsorption system according to claim 26, wherein said first body further comprises a sensor port connected to said first cavity.

40. The pressure swing adsorption system according to claim 26, wherein said first body further comprises a sensor port connected to said first passage.

41. The pressure swing adsorption system according to claim 26, wherein said first body further comprises a sensor port connected to said first channel.

42. The pressure swing adsorption system according to claim 26, wherein said first pressure vessel has a third opening, said pressure swing adsorption system further comprising:

a second valve manifold comprising:

a second body having a third cavity, a third passage and a second channel, said third cavity being fluidly connected to said third opening of said first pressure vessel, said third passage connecting said second channel to said third cavity; and a third valve provided within said third passage, said third valve being configured to selectively permit and restrict flow between said second channel and said third cavity via said third passage.

43. The pressure swing adsorption system according to claim 42, wherein;

said first valve manifold is rigidly connected to said first pressure vessel;

said first valve manifold further comprises a first mounting boss having a pin journal adapted for pivotal connection to a support structure;

said second valve manifold is rigidly connected to said first pressure vessel; and said second valve manifold further comprises a second mounting boss having a pin journal pivotally connected to a linkage that is adapted for pivotal connection to a support structure.

44. The pressure swing adsorption system according to claim 26, wherein said first passage includes a valve seat and a valve port in which said first valve is received.

45. The pressure swing adsorption system according to claim 44, wherein said valve seat is concentric with said valve port.

46. The pressure swing adsorption system according to claim 26, wherein said first valve includes a valve seal configured to be selectively actuated between a sealed contact position with a valve seat in said first passage wherein said first channel is sealed from said first cavity and a non-contact position with said valve seat, said first valve further including a secondary seal member having a metering orifice.

47. A pressure swing adsorption system comprising:

a first pressure vessel having a first opening; and a first valve manifold comprising:

a first body having a first cavity, a first passage and a first channel, said first cavity being fluidly connected to said first opening of said first pressure vessel, said first passage connecting said first channel to said first cavity; and a first valve provided within said first passage, said first valve being configured to selectively permit and restrict flow between said first channel and said first cavity via said first passage wherein;

said first valve manifold is rigidly connected to said first pressure vessel; and said first valve manifold further comprises a first mounting boss having a pin journal adapted for connection to a support structure.

48. A pressure swing adsorption system comprising:

a first pressure vessel having a first opening; and a first valve manifold comprising:

a first body having a first cavity, a first passage and a first channel, said first cavity being fluidly connected to said first opening of said first pressure vessel, said first passage connecting said first channel to said first cavity; and a first valve provided within said first passage, said first valve being configured to selectively permit and restrict flow between said first channel and said first cavity via said first passage, wherein said first valve comprises:

a non-return valve;

a metering orifice provided in parallel with said non-return valve; and an on/off valve provided in series with said non-return valve and said metering orifice.

49. The pressure swing adsorption system according to claim 48, wherein:
said non-return valve comprises a seal cup configured to receive said on/off valve therein;
said metering orifice is provided through said seal cup; and
said seal cup is spring biased toward a valve seat provided in said first passage.

50. The pressure swing adsorption system according to claim 48, wherein said first valve includes a motive device configured to linearly actuate said on/off valve in contact with and out of contact with a valve seat provided in said first passage.

51. A pressure swing adsorption system comprising:
a first pressure vessel having a first opening;
a second pressure vessel having a first opening; and
a valve manifold comprising:
a body having a first cavity, a first passage and a channel, said first cavity being fluidly connected to said first opening of said first pressure vessel, said first passage connecting said channel to said first cavity, said body having a second cavity and a second passage, said second cavity being adapted to fluidly connect to said second opening of said second pressure vessel, said second passage connecting said channel to said second cavity;
first means for selectively permitting and restricting fluid flow between said channel and said first cavity; and
second means for selectively permitting and restricting fluid flow between said channel and said second cavity,
wherein said first means is configured to not restrict flow along said channel.

* * * * *